United States Patent
Lin

(10) Patent No.: US 8,797,291 B2
(45) Date of Patent: Aug. 5, 2014

(54) CAPACITIVE TOUCH PANEL

(75) Inventor: Chuan-Min Lin, Hsinchu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 257 days.

(21) Appl. No.: 13/273,209

(22) Filed: Oct. 13, 2011

(65) Prior Publication Data

US 2012/0105365 A1    May 3, 2012

(30) Foreign Application Priority Data

Oct. 28, 2010   (TW) .............................. 99137002 A

(51) Int. Cl.
*G06F 3/045*   (2006.01)

(52) U.S. Cl.
USPC .......................................... 345/174; 345/173

(58) Field of Classification Search
USPC ...................... 345/173–179; 178/18.01–18.09
See application file for complete search history.

(56) References Cited

U.S. PATENT DOCUMENTS

| | | | |
|---|---|---|---|
| 2006/0097991 A1* | 5/2006 | Hotelling et al. | 345/173 |
| 2008/0150906 A1 | 6/2008 | Grivna | |
| 2009/0315859 A1 | 12/2009 | Chien et al. | |
| 2010/0013745 A1 | 1/2010 | Kim et al. | |
| 2011/0007030 A1* | 1/2011 | Mo et al. | 345/174 |
| 2011/0032209 A1* | 2/2011 | Kim | 345/174 |
| 2011/0187676 A1 | 8/2011 | Chang et al. | |
| 2011/0291984 A1* | 12/2011 | Chang et al. | 345/174 |
| 2012/0019450 A1* | 1/2012 | Huang et al. | 345/173 |

FOREIGN PATENT DOCUMENTS

| | | |
|---|---|---|
| CN | 101655754 A | 2/2010 |
| CN | 101859217 | 10/2010 |
| CN | 201622554 U | 11/2010 |
| TW | 200842681 | 11/2008 |
| TW | 200915159 | 4/2009 |
| TW | 200945154 | 11/2009 |
| TW | M368849 | 11/2009 |
| TW | 201015411 | 4/2010 |

OTHER PUBLICATIONS

Office Action of Taiwan Counterpart Application, issued on Jun. 27, 2013, p. 1-p. 5, in which the listed references were cited.
First Office Action of China Counterpart Application issued on Jul. 15, 2013, p. 1-p. 5, in which the listed references were cited.

* cited by examiner

*Primary Examiner* — Premal Patel
(74) *Attorney, Agent, or Firm* — Jianq Chyun IP Office

(57) ABSTRACT

A capacitive touch panel including a substrate, a plurality of first electrode strings, and a plurality of second electrode strings is provided. The first electrode strings and the second electrode strings are disposed on the substrate. A plurality of first electrodes of each of the first electrode strings are extended along a first direction. Hollow areas of the first electrodes are varied along the first direction. A plurality of second electrodes of each of the second electrode strings are extended along a second direction. Hollow areas of the second electrodes are varied along the second direction.

9 Claims, 5 Drawing Sheets

CAPACITIVE TOUCH PANEL

CROSS-REFERENCE TO RELATED APPLICATION

This application claims the priority benefit of Taiwan application serial no. 99137002, filed on Oct. 28, 2010. The entirety of the above-mentioned patent application is hereby incorporated by reference herein and made a part of this specification.

BACKGROUND

1. Field of the Invention

The invention relates to a touch panel. Particularly, the invention relates to a capacitive touch panel.

2. Description of Related Art

With development and application of information technology, wireless mobile communication techniques and information appliances, input devices of many information products have been changed from keyboards and mice to touch panels in order to achieve advantages of portability, small size, and humanity. Presently, the touch panels mainly include resistive, capacitive, acoustic wave and optical touch panels. Moreover, according to the conventional technique, when an axis intersect capacitive touch panel detects two touch points, a ghost point problem is probably occurred.

Taiwan Patent Publication No. 200842681 discloses a capacitive touch panel, and U.S. Patent Publication No. 20100013745 discloses an organic light emitting display device having a surface capacitive touch panel function, though the above patents still do not disclose a method of resolving the ghost point problem. Taiwan Patent Publication Nos. 201015411, 200915159, Taiwan Patent No. M368849 and U.S. Patent Publication No. 20080150906 disclose a plurality of methods for resolving the ghost point problem. According to the method disclosed by the U.S. Patent Publication No. 20080150906, sensing axial directions are increased, and according to the methods disclosed by the Taiwan Patent Publication Nos. 201015411, 200915159 and the Taiwan Patent No. M368849, shapes and sizes of sensing electrodes are modified.

SUMMARY OF THE INVENTION

The invention is directed to a capacitive touch panel, which could eliminate ghost points generated by multi touch points.

Additional aspects and advantages of the invention will be set forth in the description of the techniques disclosed in the invention.

To achieve one of or all aforementioned and other advantages, an embodiment of the invention provides a capacitive touch panel including a substrate, a plurality of first electrode strings, and a plurality of second electrode strings. The first electrode strings and the second electrode strings are disposed on the substrate. A plurality of first electrodes of each of the first electrode strings are extended along a first direction, and hollow areas of the first electrodes are varied along the first direction. A plurality of second electrodes of each of the second electrode strings are extended along a second direction, and hollow areas of the second electrodes are varied along the second direction.

According to the above descriptions, the capacitive touch panel of the embodiment of the invention has at least one of the following advantages. In the capacitive touch panel, the hollow areas of the first electrodes of each of the first electrode strings are varied along the first direction, and the hollow areas of the second electrodes of each of the second electrode strings are varied along the second direction. By changing the hollow areas of the first electrodes and the hollow areas of the second electrodes, sensing areas and corresponding capacitances of each of the first electrodes and each of the second electrodes are changed. It could be determined whether sensed touch positions are mutually corresponded according to the corresponding capacitances of each of the first electrodes and each of the second electrodes, and touch points are generated according to the corresponding touch positions, so as to avoid generation of the ghost points.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
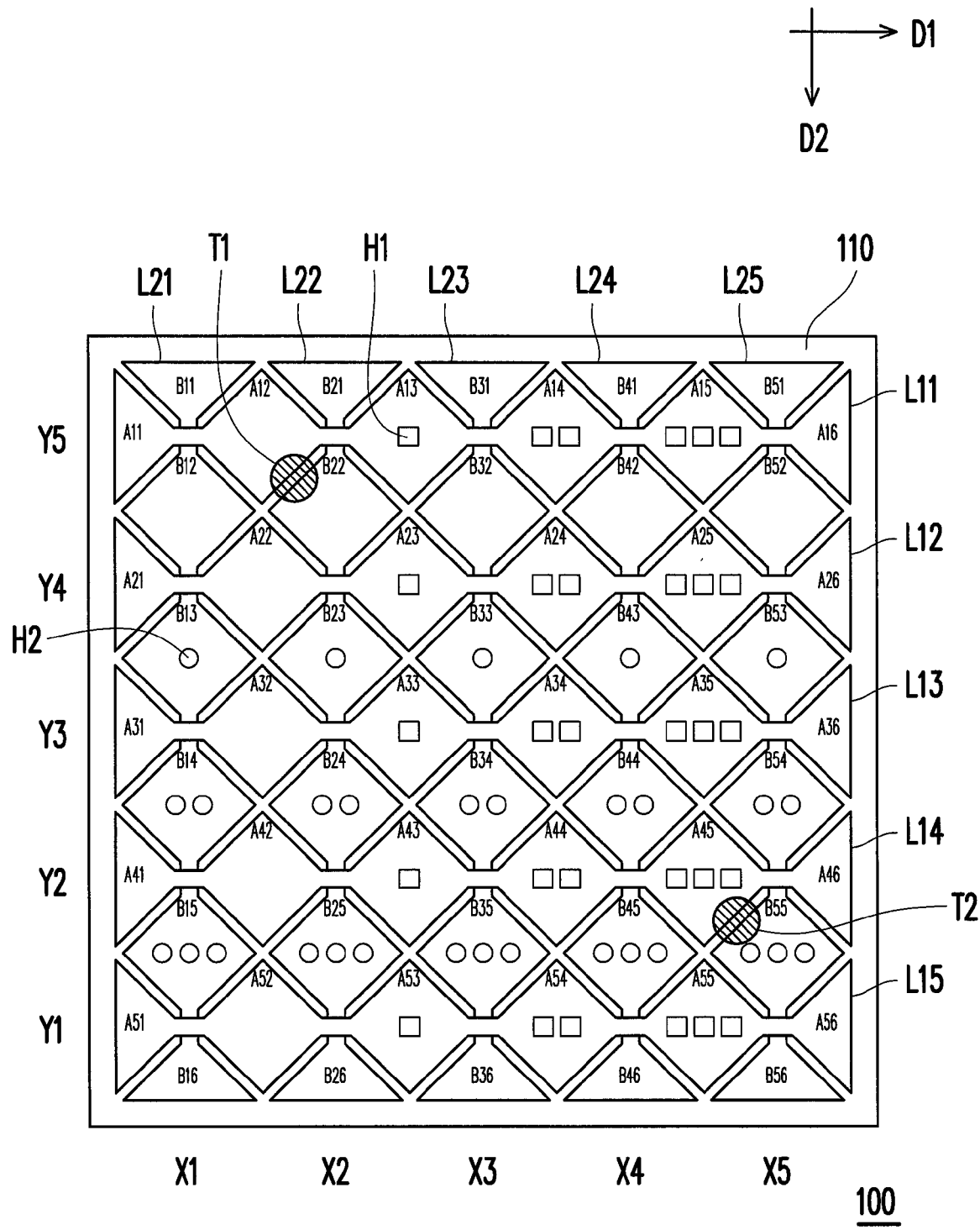
FIG. 1 is a structural schematic diagram of a capacitive touch panel according to a first embodiment of the invention.

FIG. 1 is a structural schematic diagram of a capacitive touch panel according to a first embodiment of the invention. Referring to FIG. 1, the capacitive touch panel 100 includes a substrate 110, a plurality of first electrode strings L11-L15, and a plurality of second electrode strings L21-L25. The first electrode strings L11-L15 and the second electrode strings L21-L25 are disposed on the substrate 110, and are electrically isolated from each other. The first electrode strings and the second electrode strings illustrate in FIG. 1 are only used as an example, and the invention is not limited thereto.

The first electrode string L11 includes first electrodes A11-A16, and the first electrodes A11-A16 are extended along a first direction D1. The first electrode string L12 includes first electrodes A21-A26, and the first electrodes A21-A26 are also extended along the first direction D1, and the other first electrode strings (i.e. L13-L15) are deduced by analogy, which are not repeated herein.

On the other hand, the second electrode string L21 includes second electrodes B11-B16, and the second electrodes B11-B16 are extended along a second direction D2. The second electrode string L22 includes second electrodes B21-B26, and the second electrodes B21-B26 are also extended along the second direction D2, and the other second electrode strings (i.e. L23-L25) are deduced by analogy, which are not repeated herein.

Moreover, as shown in FIG. 1, the first electrodes A11, A16, A21, A26, A31, A36, A41, A46, A51, A56 and the second electrodes B11, B16, B21, B26, B31, B36, B41, B46, B51, B56 are edge electrodes, and in the embodiments of the invention, it is assumed that the edge electrodes are maintained unchanged.

Referring to FIG. 1, taking the first electrode string L11 as an example, none hollow pattern is formed on the first electrode A12, while at least one square hollow pattern H1 is formed on each of the first electrodes A13-A15, and the number of the hollow patterns H1 on each of the first electrodes A13-A15 is increased from the left to the right, i.e. the number of the hollow patterns H1 on each of the first electrodes A13-A15 is gradually increased along the first direction D1. In other words, the number of the hollow patterns H1 on the first electrode A12 is 0, the number of the hollow patterns H1 on the first electrode A13 is 1, the number of the hollow patterns H1 on the first electrode A14 is 2, and the number of the hollow patterns H1 on the first electrode A15 is 3.

Since each of the hollow patterns H1 has a certain area, the above descriptions could be expressed as the hollow areas of the first electrodes A12-A15 are increased along the first direction D1. In other words, the hollow areas of the first electrodes A12-A15 are increased along the first direction D1 from an area of 0 hollow pattern H1 to an area of three hollow patterns H1, i.e. the hollow areas of the first electrodes A12-A15 are proportional to the numbers of the hollow patterns H1 on the first electrodes A12-A15. Since the hollow areas of the first electrodes A12-A15 are different, sensing areas of the first electrodes A12-A15 are different, and accordingly capacitances corresponding to the first electrodes A12-A15 are different. Descriptions of the first electrode strings L12-L15 could be deduced by analogy according to the description of the first electrode string L11, which are not repeated herein.

Taking the second electrode string L21 as an example, none hollow pattern is formed on the second electrode B12, while at least one circular hollow pattern H2 is formed on each of the second electrodes B13-B15, and the number of the hollow patterns H2 on each of the second electrodes B13-B15 is gradually increased from the top to the bottom, i.e. the number of the hollow patterns H2 on each of the second electrodes B13-B15 is gradually increased along the second direction D2. In other words, the number of the hollow patterns H2 on the second electrode B12 is 0, the number of the hollow patterns H2 on the second electrode B13 is 1, the number of the hollow patterns H2 on the second electrode B14 is 2, and the number of the hollow patterns H2 on the second electrode B15 is 3.

Since each of the hollow patterns H2 has a certain area, the above descriptions could be expressed as the hollow areas of the second electrodes B12-B15 are increased along the second direction D2. In other words, the hollow areas of the second electrodes B12-B15 are increased along the second direction D2 from an area of 0 hollow pattern H2 to an area of three hollow patterns H2, i.e. the hollow areas of the second electrodes B12-B15 are proportional to the numbers of the hollow patterns H2 on the second electrodes B12-B15. Since the hollow areas of the second electrodes B12-B15 are different, sensing areas of the second electrodes B12-B15 are different, and accordingly capacitances corresponding to the second electrodes B12-B15 are different. Descriptions of the second electrode strings L22-L25 could be deduced by analogy according to the description of the second electrode string L21, which are not repeated herein.

According to the above descriptions, in the first electrode strings L11-L15, the hollow areas of the first electrodes A12-A15, A22-A25, A32-A35, A42-A45 and A52-A55 are varied along the first direction D1 (which are increased in the embodiment), so that the capacitances detected by the first electrode strings L11-L15 are varied along with different horizontal touch positions. On the other hand, in the second electrode strings L21-L25, the hollow areas of the second electrodes B12-B15, B22-B25, B32-B35, B42-B45 and B52-B55 are varied along the second direction D2 (which are increased in the embodiment), so that the capacitances detected by the second electrode strings L21-L25 are varied along with different vertical touch positions.

Here, it is assumed that the touch points are T1 and T2, the second electrode strings L22 and L25 may detect the corresponding capacitances and determine touch positions X2 and X5, and the first electrode strings L11 and L14 may detect the corresponding capacitances and determine touch positions Y2 and Y5. Now, the touch position X2 is positioned according to the capacitance corresponding to the second electrode B22, the touch position X5 is positioned according to the capacitance corresponding to the second electrode B55, the touch position Y2 is positioned according to the capacitance corresponding to the first electrode A45, and the touch position Y5 is positioned according to the capacitance corresponding to the first electrode A12.

As shown in FIG. 1, since the second electrode B22 is neighboured to the first electrodes A12, A13, A22 and A23, it could be determined that the touch position X2 corresponds to the touch position Y5 according to the capacitances used for positioning, so as to position a location of the touch point T1. Since the second electrode B55 is neighboured to the first electrodes A45, A46, A55 and A56, it could be determined that the touch position X5 corresponds to the touch position Y2 according to the capacitances used for positioning, so as to position a location of the touch point T2. The neighbouring relationships of the first electrodes and the second electrodes could be expressed by relationships of the capacitances corresponding to the first electrodes and the second electrodes, and a mapping table could be established according to the relationships of the capacitances corresponding to the first electrodes and the second electrodes to serve as a basis for determination. Since each X-axis touch position corresponds to a Y-axis touch position, positions of a plurality of touch points could be correctly positioned, so as to avoid generation of ghost points.

Figure 2:
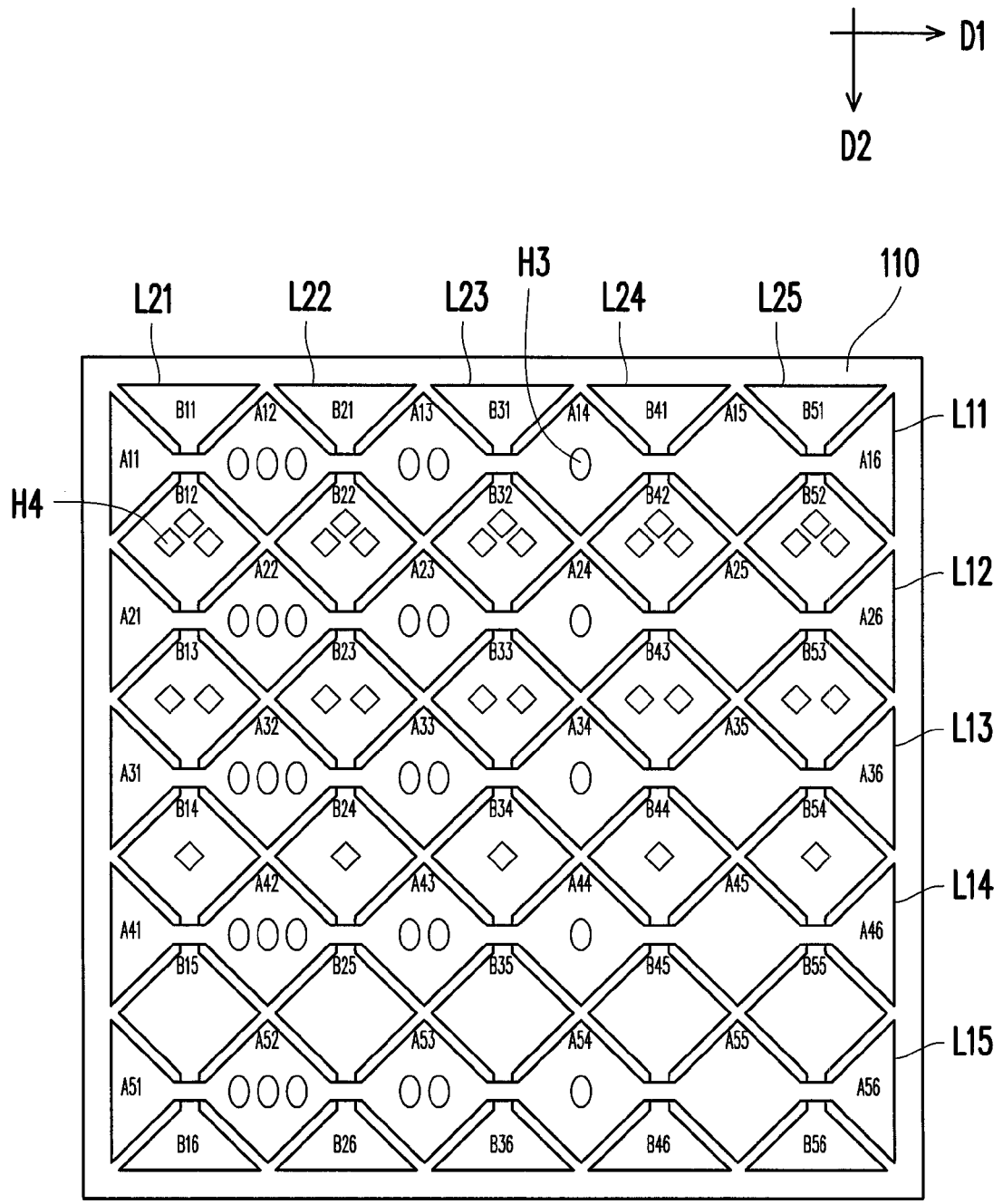
FIG. 2 is a structural schematic diagram of a capacitive touch panel according to a second embodiment of the invention.

FIG. 2 is a structural schematic diagram of a capacitive touch panel according to a second embodiment of the invention. Referring to FIG. 1 and FIG. 2, a structure of the capacitive touch panel 200 is approximately the same to the structure of the capacitive touch panel 100. However, in the capacitive touch panel 200, the numbers of hollow patterns H3 on the first electrodes A12-A15, A22-A25, A32-A35, A42-A45 and A52-A55 are decreased along the first direction D1, and the numbers of hollow patterns H4 on the second electrodes B12-B15, B22-B25, B32-B35, B42-B45, B52-B55 are decreased along the second direction D2. The hollow patterns H3 on the first electrodes A12-A15, A22-A25, A32-A35, A42-A45 and A52-A55 are, for example, ellipses, and the hollow patterns H4 on the second electrodes B12-B15, B22-B25, B32-B35, B42-B45, B52-B55 are, for example, diamonds.

Figure 3:
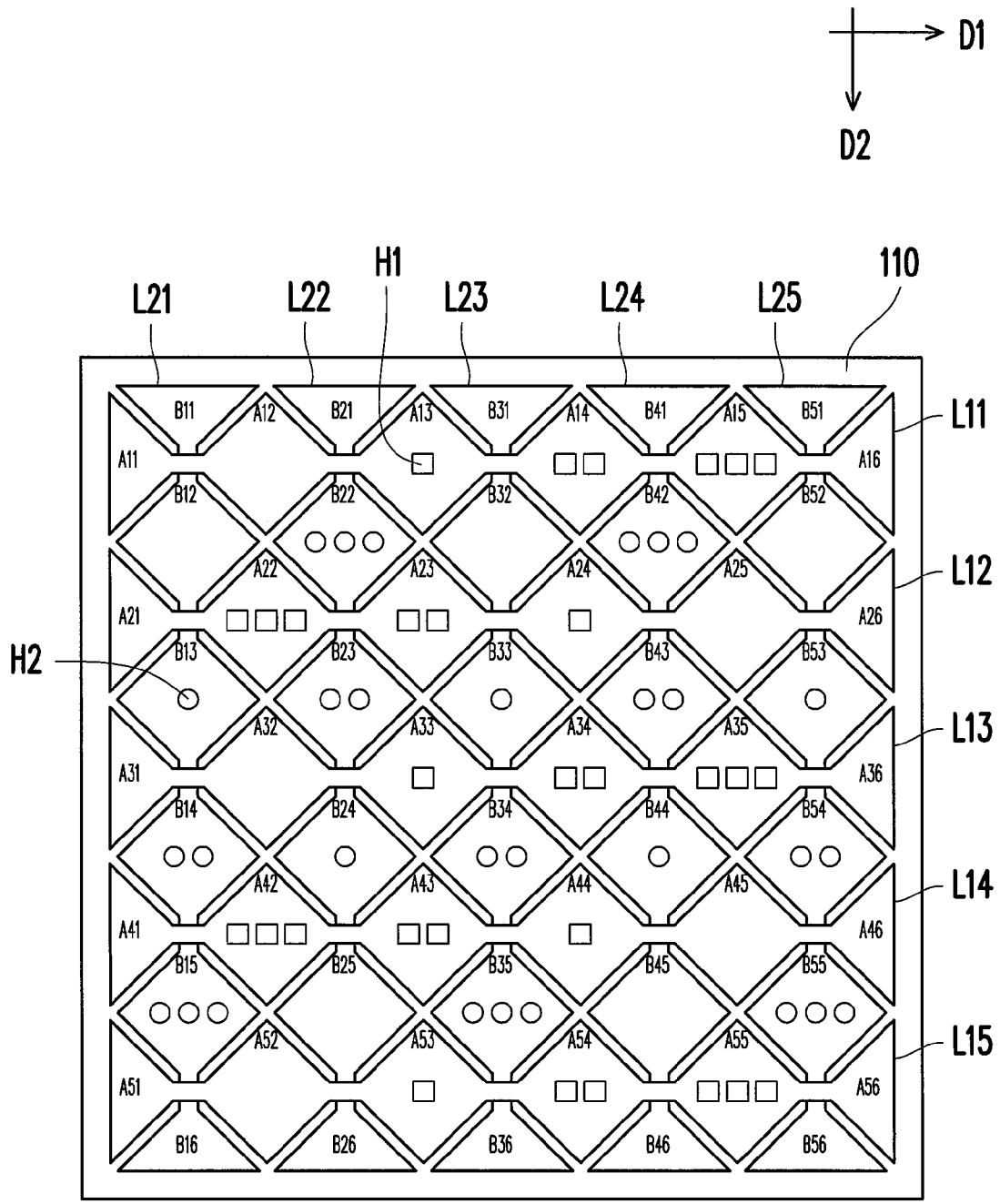
FIG. 3 is a structural schematic diagram of a capacitive touch panel according to a third embodiment of the invention.

FIG. 3 is a structural schematic diagram of a capacitive touch panel according to a third embodiment of the invention. Referring to FIG. 1 and FIG. 3, a structure of the capacitive touch panel 300 is approximately the same to the structure of the capacitive touch panel 100. However, in the capacitive touch panel 300, the numbers of the hollow patterns H1 on the first electrodes A22-A25 and A42-A45 are decreased along the first direction D1, and the numbers of the hollow patterns H2 on the second electrodes B22-B25 and B42-B45 are decreased along the second direction D2.

In other words, in the first electrode strings L11-L15, the numbers of the hollow patterns H1 on the first electrodes A12-A15, A32-A35 and A52-A55 of the odd first electrode strings L11, L13 and L15 are increased along the first direction D1, and the numbers of the hollow patterns H1 on the first electrodes A22-A25 and A42-A45 of the even first electrode strings L12 and L14 are decreased along the first direction D1.

In the second electrode strings L21-L25, the numbers of the hollow patterns H2 on the second electrodes B12-B15, B32-B35 and B52-B55 of the odd second electrode strings L21, L23 and L25 are increased along the second direction D2, and the numbers of the hollow patterns H2 on the second electrodes B22-B25 and B42-B45 of the even second electrode strings L22 and L24 are decreased along the second direction D2.

Figure 4:
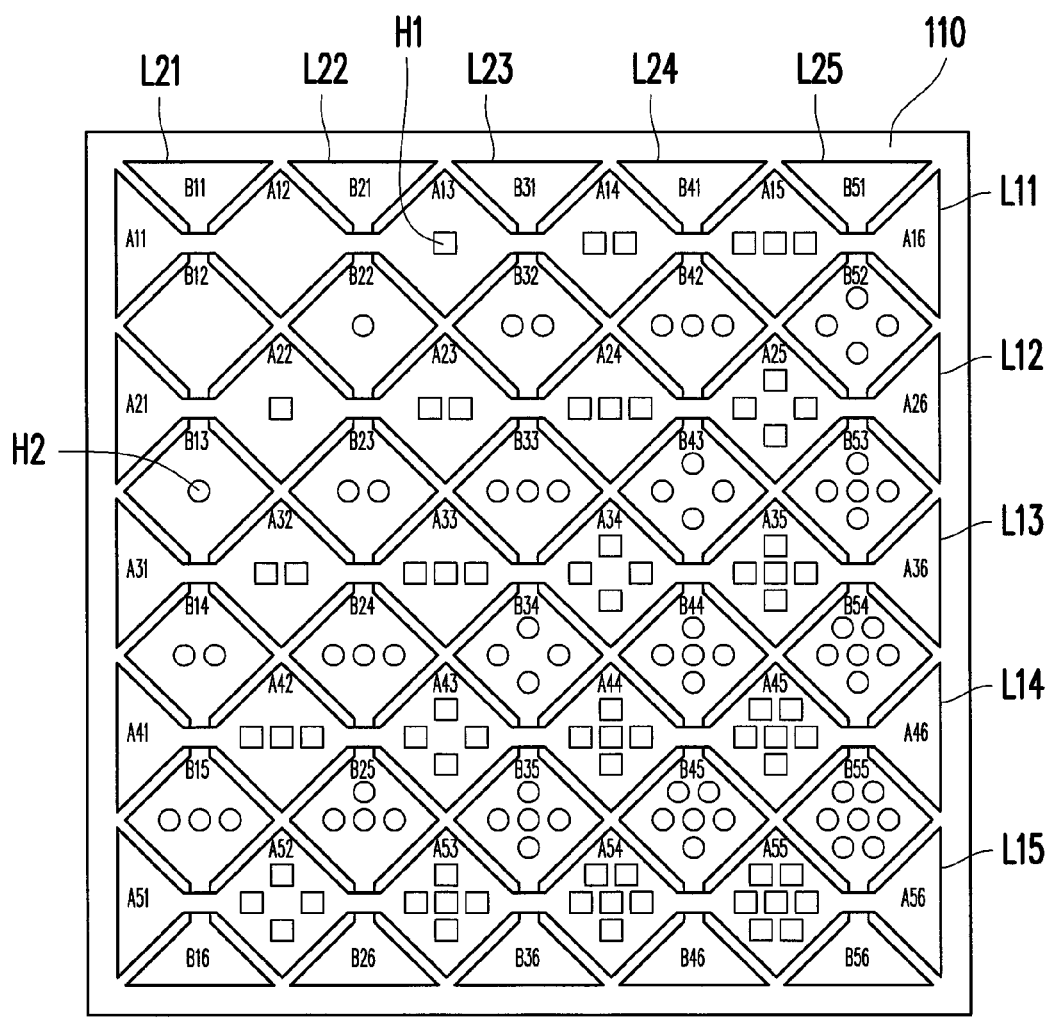
FIG. 4 is a structural schematic diagram of a capacitive touch panel according to a fourth embodiment of the invention.

FIG. 4 is a structural schematic diagram of a capacitive touch panel according to a fourth embodiment of the invention. Referring to FIG. 1 and FIG. 4, a structure of the capacitive touch panel 400 is approximately the same to the structure of the capacitive touch panel 100. However, in the capacitive touch panel 100, initial values of the numbers of the hollow patterns H1 on the first electrodes A12-A15, A22-A25, A32-A35, A42-A45 and A52-A55 of the first electrode strings L11-L15 are the same, i.e. the numbers of the hollow patterns H1 on the first electrodes A12-A15, A22-A25, A32-A35, A42-A45 and A52-A55 are all increased from 0 to 3.

However, in the capacitive touch panel 400, initial values of the numbers of the hollow patterns H1 on the first electrodes A12-A15, A22-A25, A32-A35, A42-A45 and A52-A55 of the first electrode strings L11-L15 are different, i.e. the numbers of the hollow patterns H1 on the first electrodes A12-A15 are increased from 0 to 3, the numbers of the hollow patterns H1 on the first electrodes A22-A25 are increased from 1 to 4, the numbers of the hollow patterns H1 on the first electrodes A32-A35 are increased from 2 to 5, the numbers of the hollow patterns H1 on the first electrodes A42-A45 are increased from 3 to 6, and the numbers of the hollow patterns H1 on the first electrodes A52-A55 are increased from 4 to 7.

On the other hand, in the capacitive touch panel 100, initial values of the numbers of the hollow patterns H2 on the second electrodes B12-B15, B22-B25, B32-B35, B42-B45 and B52-B55 of the second electrode strings L21-L25 are the same, i.e. the numbers of the hollow patterns H2 on the second electrodes B12-B15, B22-B25, B32-B35, B42-B45 and B52-B55 are all increased from 0 to 3.

However, in the capacitive touch panel 400, initial values of the numbers of the hollow patterns H2 on the second electrodes B12-B15, B22-B25, B32-B35, B42-B45 and B52-B55 of the second electrode strings L21-L25 are different, i.e. the numbers of the hollow patterns H2 on the second electrodes B12-B15 are increased from 0 to 3, the numbers of the hollow patterns H2 on the second electrodes B22-B25 are increased from 1 to 4, the numbers of the hollow patterns H2 on the second electrodes B32-B35 are increased from 2 to 5, the numbers of the hollow patterns H2 on the second electrodes B42-B45 are increased from 3 to 6, and the numbers of the hollow patterns H2 on the second electrodes B52-B55 are increased from 4 to 7.

Figure 5:
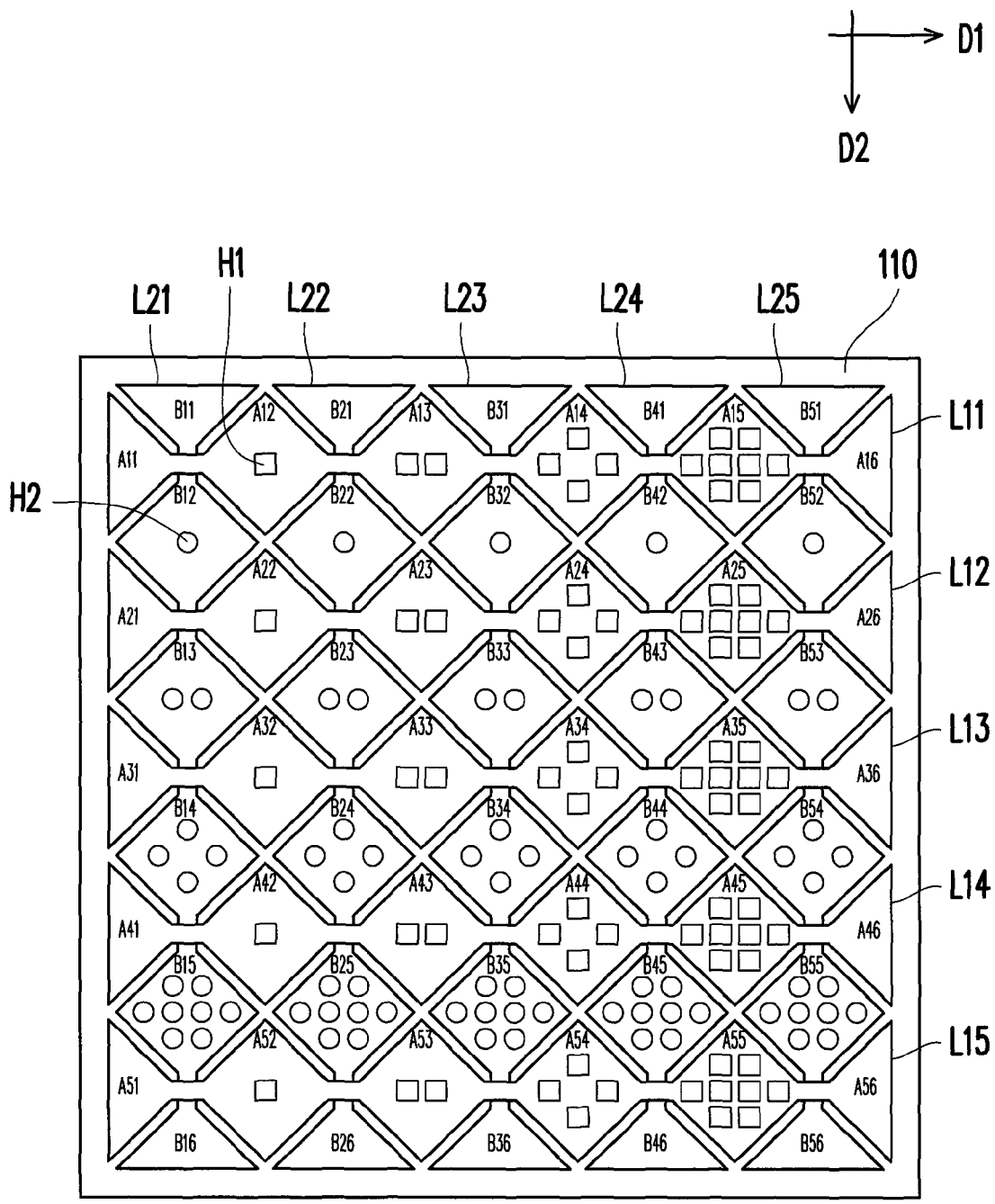
FIG. 5 is a structural schematic diagram of a capacitive touch panel according to a fifth embodiment of the invention.

FIG. 5 is a structural schematic diagram of a capacitive touch panel according to a fifth embodiment of the invention. Referring to FIG. 1 and FIG. 5, a structure of the capacitive touch panel 500 is approximately the same to the structure of the capacitive touch panel 100. However, in the capacitive touch panel 100, the numbers of the hollow patterns H1 on the first electrodes A12-A15, A22-A25, A32-A35, A42-A45 and A52-A55 of the first electrode strings L11-L15 are increased by arithmetic progression, i.e. the numbers of the hollow patterns H1 on the first electrodes A12-A15, A22-A25, A32-A35, A42-A45 and A52-A55 are progressively increased by 1.

However, in the capacitive touch panel 500, the numbers of the hollow patterns H1 on the first electrodes A12-A15, A22-A25, A32-A35, A42-A45 and A52-A55 of the first electrode strings L11-L15 are increased by geometric progression, i.e. the numbers of the hollow patterns H1 on the first electrodes A12-A15, A22-A25, A32-A35, A42-A45 and A52-A55 are progressively increased by multiplying 2.

On the other hand, in the capacitive touch panel 100, the numbers of the hollow patterns H2 on the second electrodes B12-B15, B22-B25, B32-B35, B42-B45 and B52-B55 of the second electrode strings L21-L25 are increased by arithmetic progression, i.e. the numbers of the hollow patterns H2 on the second electrodes B12-B15, B22-B25, B32-B35, B42-B45 and B52-B55 are progressively increased by 1.

However, in the capacitive touch panel 500, the numbers of the hollow patterns H2 on the second electrodes B12-B15, B22-B25, B32-B35, B42-B45 and B52-B55 of the second electrode strings L21-L25 are increased by geometric progression, i.e. the numbers of the hollow patterns H2 on the second electrodes B12-B15, B22-B25, B32-B35, B42-B45 and B52-B55 are progressively increased by multiplying 2.

Moreover, in various embodiments of the invention, a part of the embodiments are provided for descriptions, and other embodiments could be derived according to the descriptions of the above embodiments, for example, the first electrode strings L11-L15 of the capacitive touch panel 100 are used in collaboration with the second electrode strings L21-L25 of the capacitive touch panel 400, or the first electrode strings L11-L15 of the capacitive touch panel 200 are used in collaboration with the second electrode strings L21-L25 of the capacitive touch panel 300, though the embodiments of the invention are not limited thereto. Moreover, the hollow patterns mentioned in the above embodiments of the invention are squares, circles, ellipses or diamonds, though the geometric shape of the hollow pattern is not limited by the invention.

In summary, the capacitive touch panel of the embodiment of the invention has at least one of the following advantages. In the capacitive touch panel, by forming the hollow patterns on the electrodes, the hollow areas of the electrodes of each of the electrode strings are changed, so as to change the sensing area and the corresponding capacitance of each electrode. It could be determined whether sensed touch positions are corresponded according to the corresponding capacitance of each of the electrode, and the touch points are generated according to the corresponding touch positions, so as to avoid generation of the ghost points.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A capacitive touch panel, comprising:
a substrate;
a plurality of first electrode strings, disposed on the substrate, and each of the first electrode strings having a plurality of first electrodes, wherein the first electrodes of each of the first electrode strings are extended along a first direction, each of the first electrodes have the same shape, a portion of the first electrodes have at least one hollow hole, and the total areas of the hollow holes of one of the first electrodes in each first electrode strings are varied along the first direction; and
a plurality of second electrode strings, disposed on the substrate, and each of the second electrode strings having a plurality of second electrodes, wherein the second electrodes of each of the second electrode strings are extended along a second direction, each of the second electrodes have the same shape, a portion of the second electrodes have at least one hollow hole, and total areas of the hollow holes of one of the second electrodes in each second electrode strings are varied along the second direction,
wherein the total area of the hollow holes of the first electrode is proportional to a number of the hollow holes of the first electrode, each of the hollow holes has the same area, a portion of the first electrodes have at least two hollow holes, the total area of the hollow holes of the second electrode is proportional to a number of hollow holes of the second electrode, each of the hollow holes has the same area, and a portion of the second electrodes have at least two hollow holes.

2. The capacitive touch panel as claimed in claim 1, wherein the hollow areas of the first electrodes are increased along the first direction, and the hollow areas of the second electrodes are increased along the second direction.

3. The capacitive touch panel as claimed in claim 1, wherein the hollow areas of the first electrodes are decreased along the first direction, and the hollow areas of the second electrodes are decreased along the second direction.

4. The capacitive touch panel as claimed in claim 1, wherein the first electrode strings comprise a plurality of odd electrode strings and a plurality of even electrode strings, wherein the hollow areas of the first electrodes of the odd electrode strings are increased along the first direction, and the hollow areas of the first electrodes of the even electrode strings are decreased along the first direction.

5. The capacitive touch panel as claimed in claim 1, wherein initial values of the numbers of the hollow patterns of the first electrodes of the first electrode strings are different.

6. The capacitive touch panel as claimed in claim 5, wherein initial values of the numbers of the hollow patterns of the second electrodes of the second electrode strings are the same.

7. The capacitive touch panel as claimed in claim 5, wherein initial values of the numbers of the hollow patterns of the second electrodes of the second electrode strings are different.

8. The capacitive touch panel as claimed in claim 1, wherein the numbers of the hollow patterns of the first electrodes are progressively increased along the first direction by geometric progression.

9. The capacitive touch panel as claimed in claim 1, wherein the numbers of the hollow patterns of the first electrodes are progressively increased along the first direction by arithmetic progression.

* * * * *